United States Patent [19]
Gurevich et al.

[11] Patent Number: 4,707,053
[45] Date of Patent: Nov. 17, 1987

[54] HOLOGRAPHIC RECORDING DEVICE

[76] Inventors: Simkha B. Gurevich, prospekt Nauki, 10. korpus 2, kv. 5; Vladimir B. Konstantinov, prospekt M.Toreza, 9, kv. 22; Dmitry F. Chernykh, ulitsa S.Perovskoi, 3, kv. 28; Vladislav M. Levushkin, ulitsa Kalyaeva, 17, kv. 34; Svetlana A. Pisarevskaya, ulitsa Kronverxkava, 29/37, kv. 109; Mikhail S. Cheberyak, V.O., 8-ya linia, 59, kv. 11; Alexandr I. Latyshev, Bogatyrsky prospekt, 7, korpus 3, kv. 62, all of Leningrad, U.S.S.R.

[21] Appl. No.: 711,374

[22] Filed: Mar. 13, 1985

[30] Foreign Application Priority Data
Apr. 6, 1984 [SU] U.S.S.R. .............................. 3715404

[51] Int. Cl.⁴ ........................... G03H 1/02; G02B 7/00
[52] U.S. Cl. ........................................ 350/3.6; 350/574
[58] Field of Search .......................... 350/3-6, 350/574, 576

[56] References Cited
PUBLICATIONS

"Small Beam Steering Unit," Ealing Beck Ltd., 1976-1977 catalog.
Rogero, S., et al, "Pulsed Laser Holography-New Instrumentation for Use in the Investigation of Liquid Rocket Combustion," Conference: Proceedings of the 15th International ISA Aerospace Instrumentation Symposium, Las Vegas, Nev., 5-7 May 1969, pp. 1-9.
Wuerker, R., et al, "Holography on Space Shuttle, SPIE vol. 215, Recent Advances in Holography, (1980), pp. 76-84.

Primary Examiner—John K. Corbin
Assistant Examiner—D. Edmondson
Attorney, Agent, or Firm—Lilling & Greenspan

[57] ABSTRACT

A holographic recording device includes an acoustical and vibration protection package having, mounted in an enclosure, at least three spaced apart supporting elements, a means for producing reference and object beams being secured to the supporting elements, while a coherent source is rigidly secured to at least two supporting elements. Supporting elements are rigidly secured to at least two rods and a screen set perpendicular to said supporting elements. A holographic recorder is positioned after the means for producing reference and object beams in the path of the source beam.

3 Claims, 17 Drawing Figures

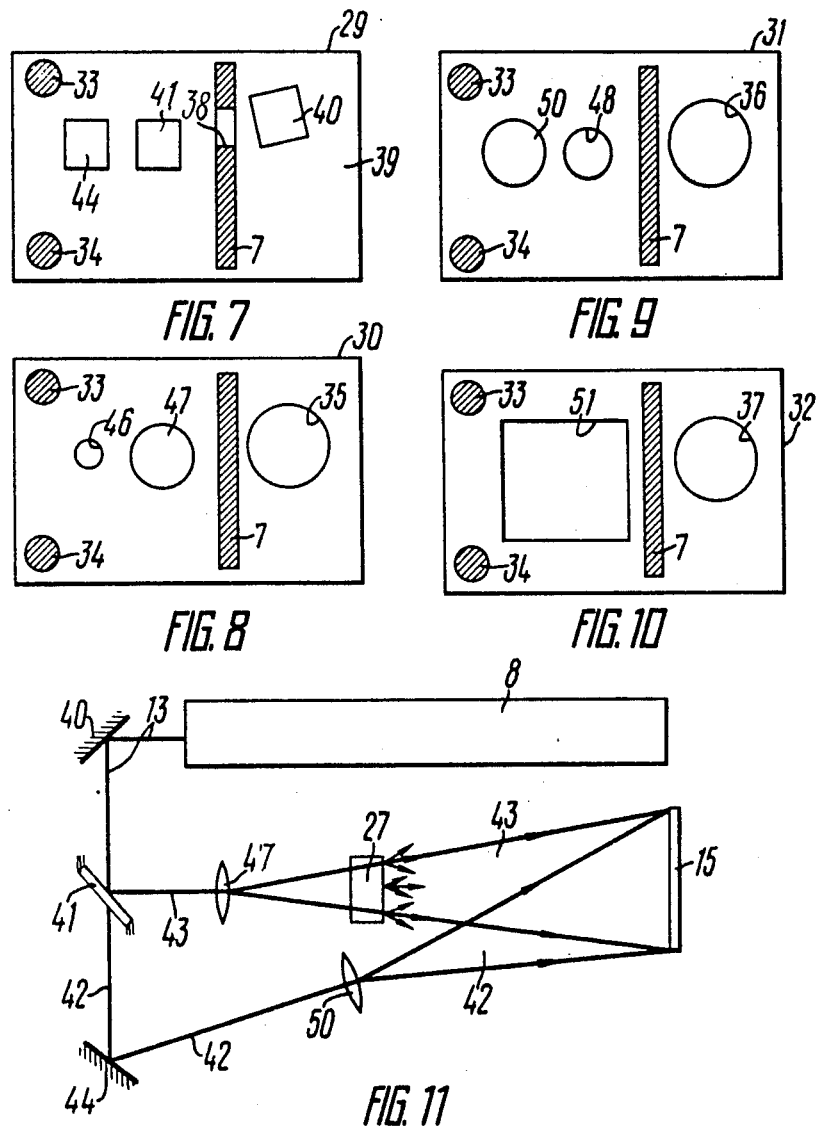

HOLOGRAPHIC RECORDING DEVICE

BACKGROUND OF THE INVENTION

1. Field of the Invention

This invention relates to optics and, in particular, to holographic recording devices.

The invention can be used in research or industrial applications for studying physical and chemical processes involving variations of refractive indexes, such as dissolution and growth of crystals, electrolysis, and electrophoresis, and for studying hydrodynamic and aerodynamic processes, processes of mass and heat transfer, combustion, biophysical processes of microscopic objects, including biological objects, and also for monitoring the operation of machines and devices, and microelectronic elements.

2. Description of the Prior Art

Holographic devices used for recording holograms and holographic interferograms should be made extremely mechanically stable. Any shift of the interferogram image in the recording plane for a fraction of a period (0.2–0.3 micrometers) during the exposure time practically destroys the recording, and mechanical stability is all important in this case. It can be disturbed by mechanical vibrations, acoustical vibrations, air currents, and thermal expansion of the holographic circuit elements.

The prior art holographic recording devices are bulky and can only be used as stationary laboratory equipment. They are in no way suitable for operation in such extreme conditions as space research facilities or test chambers simulating high altitude conditions.

Known in the art is a holographic recording system (cf., for example, Holography on the NASA Space Shuttle, Palph F. Werker et al, Proceedings of the International Conference "Optical in Four Dimensions", Aug. 4, 1980, Mexico) comprising a package for acoustical and vibration protection, a coherent light source mounted therein, a means for producing a reference beam and a scene beam, which is located downstream the source beam from the coherent light source, and a holographic recorder.

In this holographic recording device the acoustical and vibration protection package comprises a platform and support rails secured thereto by a shock-absorbing system of vacuum holders which are also used to secure the means for producing the reference and scene beams on the platform.

But this device is deficient in that the effect of the low and high frequency oscillations and acoustical vibrations is reduced by making the structure more rigid and the platform heavier, which results in a bulkier device whose dimensions are a limitation in many applications.

SUMMARY OF THE INVENTION

It is an object of the invention to provide a holographic recording device wherein low- and high-frequency mechanical vibrations are substantially reduced.

Another object of this invention is to reduce acoustical interferences.

One more object of the invention is to reduce the bulk and weight of the holographic recording device.

Still another object of the invention is to broaden the field of application of the holographic recording device.

This is achieved by a holographic recording device comprising an acoustical and vibration protection package and, mounted therein, a coherent light source, a means for generating reference and object beams, which is arranged downstream the pat of the source beam from the coherent light source, and a holgraphic recorder, according to the invention, the acoustical and vibration protection package comprises an enclosure and, arranged therein, at least three spaced apart supporting elements, the means for generating the reference and object beams being rigidly secured to each of said supporting elements, while the coherent light source is ridigly secured to at least two of said supporting elements, at least two rods rigidly secured to the supporting elements, and a screen for isolation of the coherent light source, in which an opening is provided to let through the source beam and which is set perpendicularly to the supporting elements rigidly secured thereto.

The supporting elements of the acoustical and vibration protection package in the holographic recording device, according to the invention, should preferably be made as plates having openings whose shape and number is dictated by the selected means for generating reference and object beams.

It is desirable that in a holographic recording device, according to the invention, wherein the means for generating reference and object beams comprises, arranged across the path of the source beam, two mirrors, a beamsplitter which divides said source beam into a reference beam and an object beam, a last mirror located across the reference beam, and two lenses located, respectively, after the beamsplitter and the last mirror, the acoustical and vibration protection package should be provided with three plates, one plate having an opening made as a slot and carrying, on the surface facing the next plate, two mirrors set at an angle to one another, the next plate provided with two round openings and one slot-like opening and carrying, on the surface facing the last plate, a beamsplitter with a lens and the last mirror with a lens, which are arranged at an angle to each other near one of the round openings, and the last plate provided with a round opening, a slot-like opening and a rectangular opening wherein the holographic recorder is mounted, the screen extending through the openings in all three plates, while the body of the coherent light source extends through the round openings of two plates.

This invention permits a three-dimensional arrangement of optical components of a holographic recording device and, thus, a substantial reduction of low- and high-frequency vibrations and acoustical interferences.

In addition, this invention provides a more rigid structure of the proposed holographic recording device and, therefore, permits a serious reduction of low- and high-frequency vibrations.

This invention makes the holographic recording device more thermally stable.

This invention also makes the holographic recording device smaller and lighter in weight.

BRIEF DESCRIPTION OF ACCOMPANYING DRAWINGS

Other objects and advantages of the present invention will become more apparent from the following detailed description of preferred embodiments thereof, taken in conjunction with the accompanying drawings, wherein:

FIG. 7 shows a section view taken along line VII—VII in FIG. 6, minus the coherent light source, according to the invention;

FIG. 8 shows a section view taken along line VIII—VIII in FIG. 6, minus the coherent light source, according to the invention;

FIG. 9 shows a section view taken along line IX—IX in FIG. 6, minus the coherent light source, according to the invention;

FIG. 10 shows a view taken along arrow B in FIG. 6, minus the coherent light source, according to the invention;

FIG. 11 shows a functional block diagram of a holographic recording device of FIG. 6, according to the invention;

DESCRIPTION OF THE PREFERRED EMBODIMENTS

Figure 1:
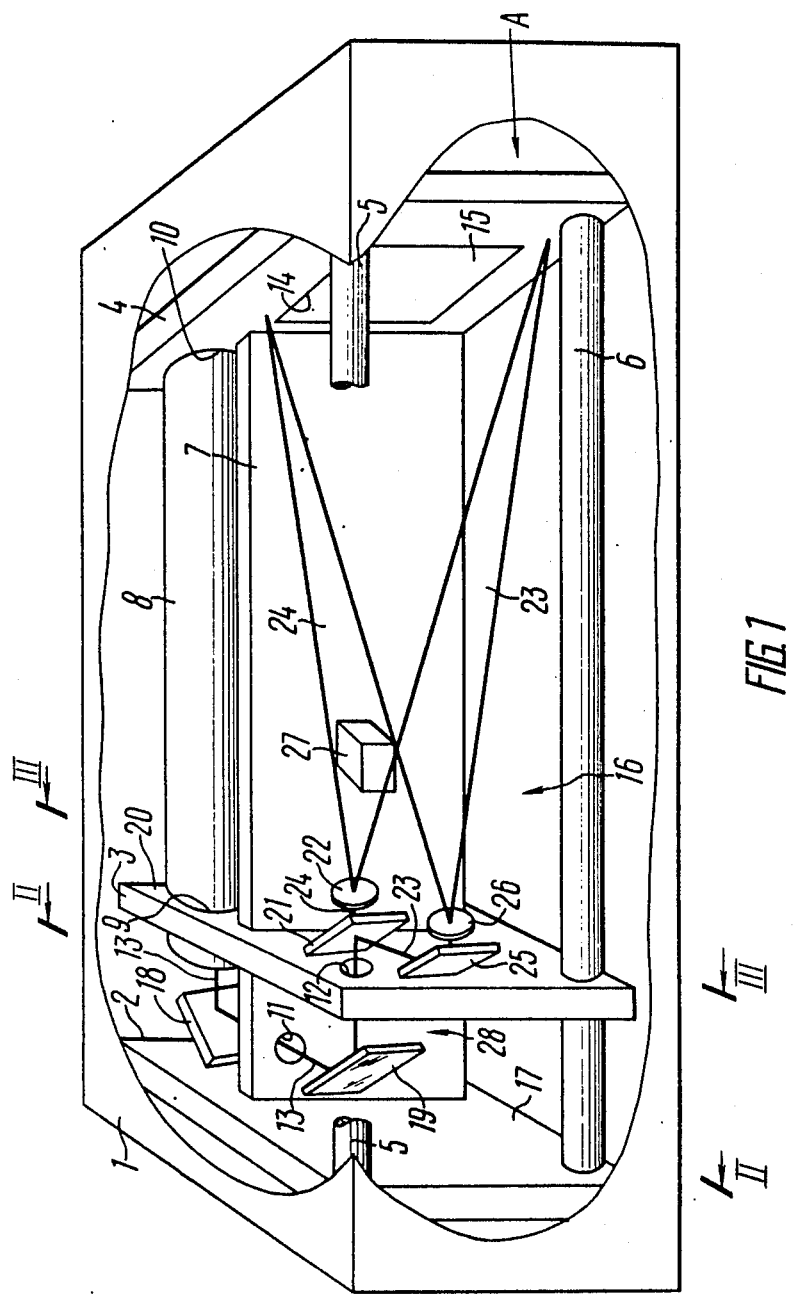
FIG. 1 shows an axonometric general view of a holographic recording device, according to the invention.
Figure 2:
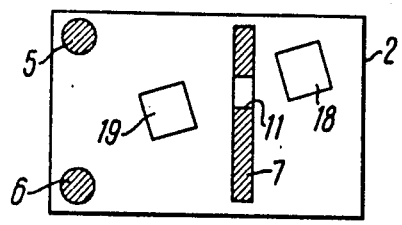
FIG. 2 shows a section view taken along line II—II in FIG. 1, according to the invention.

A holographic recording device comprises an enclosure 1 (FIG. 1) and, mounted therein, three spaced apart supporting elements made as plates 2, 3 and 4 rigidly secured by rods 5 and 6 (FIGS. 1, 2, 3 and 4) extending through openings made in the plates. The plates 2, 3 and 4 are provided with slot-like openings through which a screen 7 for isolating a coherent light source 8 extends. The source 8 extends through openings 9 and 10 provided in the plates 3 and 4. The screen 7 and the plate 3 are provided with round openings 11 and 12, respectively, to let through a source beam 13. The plate 4 is provided with a rectangular opening 14 (FIG. 4) in which a holographic recorder 15 is placed. The plates 2, 3 and 4, the rods 5 and 6, and the screen 7 form an acoustical and vibration protection package 16.

Figure 5:
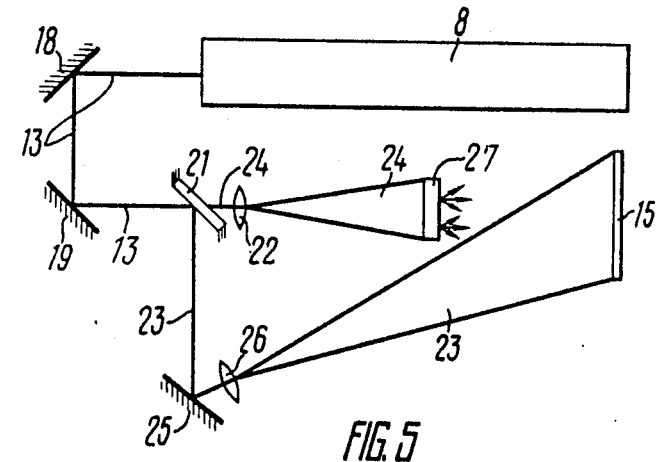
FIG. 5 shows a functional block diagram of a holographic recording device of FIG. 1, according to the invention.

In the path of the source beam 13 from the coherent light source 8 and on a surface 17 of the plate 2, a mirror 18 (FIGS. 1 and 5) is mounted. A mirror 19 is mounted on the other side of the screen 7, in the path of the beam 13 reflected from the mirror 18 into the round opening 11, on the surface 17 of the plate 2. The mirrors 18 and 19 are set at an angle to each other.

A beamsplitter 21 with a lens 22 are mounted on a surface 20 of the plate 3 in the path of the beam 13 reflected from the mirror 19 into the round opening 12 of said plate 3. The beamsplitter 21 produces a reference beam 23 reflected therefrom and an object beam 24 passing therethrough. A mirror 25 with a lens 26 are mounted on the surface 20 of the plate 3 in the path of the reference beam 23 coming from the beamsplitter 21. A holographic object 27 is placed in the path of the object beam 24 coming from the beamsplitter 21. The mirrors 18, 19 the beamsplitter 21, and lenses 22 and 26 form a means 28 for producing reference and object beams.

Figure 6:
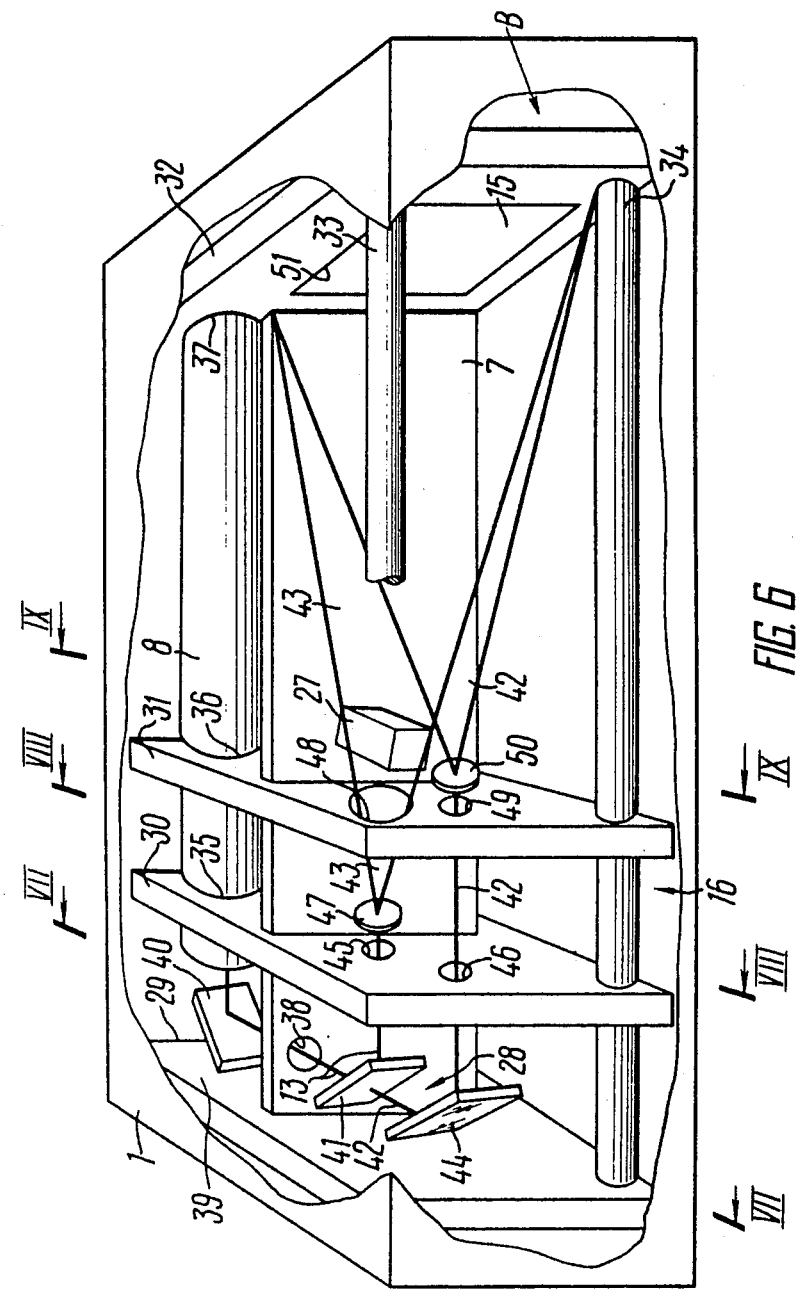
FIG. 6 shows an axonometric general view of a holographic recording device featuring four plates and a holographic object positioned in front of a holographic recorder, according to the invention.

In another embodiment, a holographic recording device comprises four plates 29, 30, 31 and 32 (FIG. 6) rigidly secured to one another by rods 33 and 34 (FIGS. 6, 7, 8, 9 and 10) extending through openings made in said four plates. The plates 29, 30, 31 and 32 are provided with slot-like openings through which the screen 7 extends. The paltes 30, 31 and 32 are provided with round openings 35, 36 and 37 through which the body of the coherent light source 8 extends. The screen 7 has an opening 38 to let thorugh the source beam 13. The plates 29, 30, 31 and 32, the rods 33 and 34, and the screen 7 form an acoustic vibration protection package 16.

A mirror 40 (FIGS. 6 and 11) is mounted on a surface 39 of the plate 29 in the path of the beam 13 from the coherent light source 8. A beamsplitter 41 is mounted on the surface 39 of the plate 29 on the other side of the screen 7 in the path of the beam 13 reflected from the mirror 40 into the opening 38. The beam-splitter 41 is set at an angle to the mirror 40 and produces a reference beam 42 and an object beam 43. A mirror 44 is mounted parallel to the beamsplitter 41 on the surface 39 of the plate 29 in the path of the reference beam 42 from the beamsplitter 41.

The plate 30 is provided with round openings 45 and 46 to let through the object beam 43 and the reference beam 42, respectively. A lens 47 is placed in the opening 45 of the plate 30. The plate 31 is provided with round openings 48 and 49 to let through, respectively, the object beam 43 and the reference beam 42. A lens 50 is placed in the opening 49 of the plate 31. The plate 32 is provided with a rectangular opening 51 (FIG. 10) wherein a holographic recorder 15 (FIG. 6) is placed. A holographic object 27 (FIGS. 1 and 6) is placed, as needed, in the path of the object beam 43 in front of the round opening 48 in the plate 31. The mirror 40 and 44, the beamsplitter 41, and the lenses 47 and 50 form a means 28 for producing reference and object beams.

Figure 12:
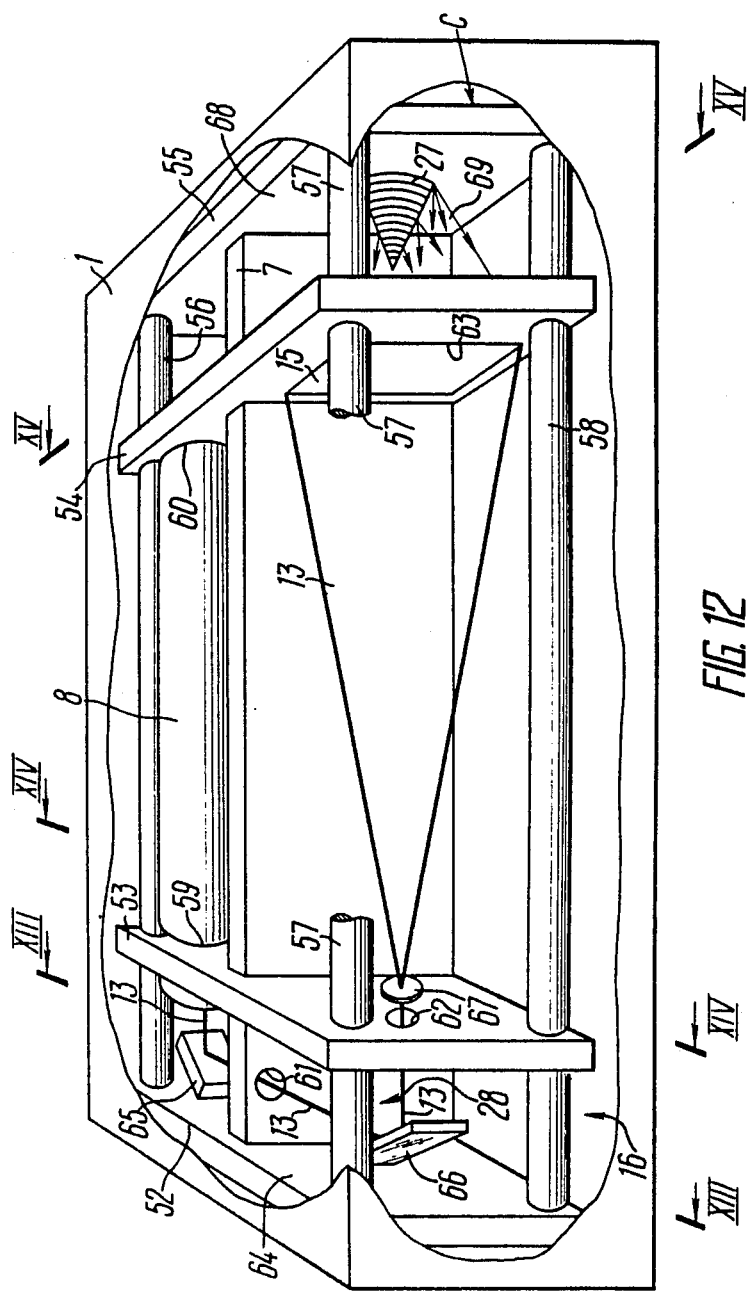
FIG. 12 shows an axonometric general view of a holographic recording device featuring four plates and a holographic object positioned after a holographic recorder according to the invention.
Figure 13:
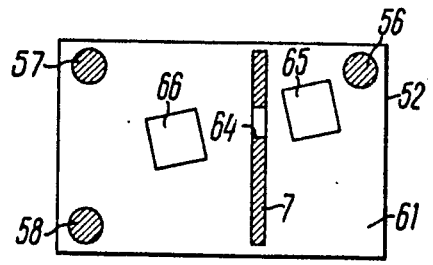
FIG. 13 shows a section view taken along line XIII—XIII in FIG. 12, minus the coherent light source, according to the invention.
Figure 15:
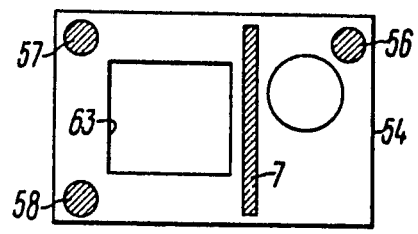
FIG. 15 shows a section view taken along line XV—XV in FIG. 12, minus the coherent light source, according to the invention.
Figure 14:
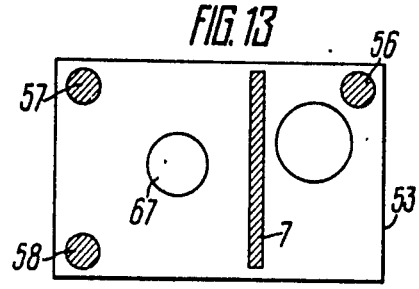
FIG. 14 shows a section view taken along line XIV—XIV in FIG. 12, minus the coherent light source, according to the invention.
Figure 16:
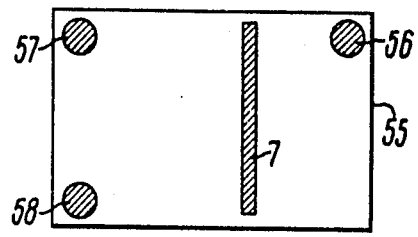
FIG. 16 shows a view taken along arrow C in FIG. 12, minus the coherent light source, according to the invention.

In one more embodiment, a holographic recording device comprises four plates 52, 53, 54 and 55 (FIG. 12) rigidly secured to one another by rods 56, 57 and 58 (FIGS. 12, 13, 14, 15, 16) extending through the openings provided therein. The plates 52, 53, 54 and 55 are provided with openings made as slots through which the screen 7 extends. The plates 53 and 54 are provided with round openings 59 and 60 through which the body of a coherent light source 8 (FIG. 12) extends. The screen 7 and the plate 53 have openings 61 and 62, respectively, to let through the source beam 13 (FIG. 12) The plate 54 has a rectangular opening 63 (FIG. 12 and 15) wherein a holographic recorder 15 (FIG. 12) is placed. The plates 52, 53, 54 and 55, the rods 56, 57 and 58, and the screen 7 form an acoustic and vibration protection package 16.

Figure 17:
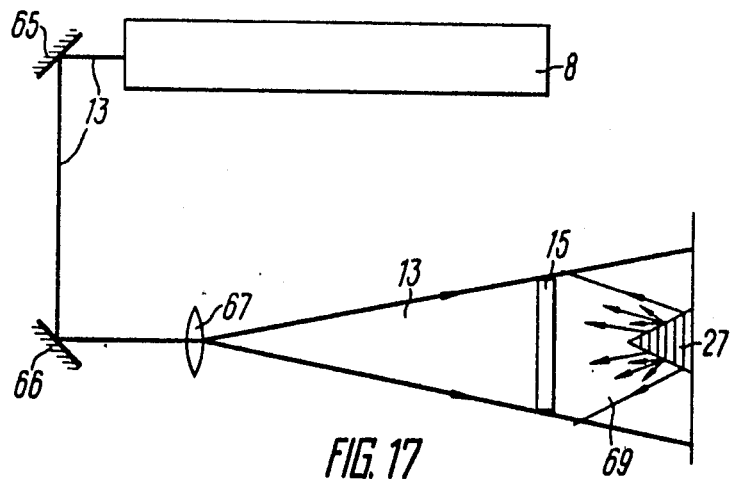
FIG. 17 shows a functional block diagram of a holographic recording device of FIG. 12, according to the invention.

A mirror 65 (FIGS. 12 and 17) is mounted on a surface 64 of the plate 52 in the path of the beam 13 from the coherent source 8. On the other side of the screen 7, a mirror 66 is mounted on the surface 64 of the plate 52 at an angle to the mirror 65 in the path of the beam 13 reflected from the mirror 65 through the opening 61. A lens 67 is mounted in the opening 62 of the plate 53 in the path of the beam 13. A holographic object 27 is placed, as needed, on a surface 68 of the plate 55 to produce an object beam 69. The mirrors 65 and 66, the lens 67, and the holographic object 27 form a means 28 for producing reference and object beams.

A holographic recording device of FIGS. 1, 2, 3, 4 and 5 operates as follows.

The source beam 13 coming from the coherent source 8 strikes the mirror 18 is reflected therefrom and impinges on the mirror 19 through the opening 11 in the screen 7. Next, the beam 13 comes to the beamsplitter 21 through the opening 12 in the plate 3 and is divided into the object beam 24 and the reference beam 23. The object beam 24 is incident upon the lens 22 and the already divergent beam illuminates the object 27. The reference beam 23 strikes the mirror 25 to be directed to the lens 26. The divergent beam 23 is directed to the holographic recorder 15 where it is superposed on the object beam 24 scattered by the object 27. The holographic recorder records the interference pattern of the object beam 24 and the reference beam 23.

A holographic recording device of FIGS. 6, 7, 8, 9, 10 and 11 operates as follows.

The source beam 13 coming from the coherent source 8 strikes the mirror 40 is reflected therefrom and impinges, through the opening 38 in the screen 7, on the beamsplitter 41 which divides the beam 13 into the object beam 43 and the reference beam 42. The beam 43 passes, through the opening 45 in the plate 30, to the lens 47 and the divergent beam 43 illuminates the holographic object 27. The reference beam 42 strikes the mirror 44 which directs it through the opening 46 in the plate 30 and the opening 49 in the plate 31 to the lens 50. The device further operates as described above.

A holographic recording device of FIGS. 12, 13, 14, 15, 16 and 17 operates as follows.

The source beam 13 coming from the coherent source 8 strikes the mirror 65 is reflected therefrom and impinges on the mirror 66 passing through the opening 61 in the screen 7. The beam 13 is reflected from the mirror 6 and passes through the opening 62 in the plate 53 to the lens 67. The divergent beam 13 is directed to the holographic recorder 15, passes through the recorder 15 as the reference beam and illuminates the holographic object 27. The beam 69 scattered by the holographic object 27 propagates towards the source beam 13 and is superimposed thereon in the recorder 15. The recorder 15 records the image of interference of the source beam 13 and the object beam 69.

In accordance with the invention, the arrangement of plates in all embodiments of a holographic recording device, which are secured by rods and through which a screen extends, provides a balanced spatial arrangement of optical components, thus ensuring improved resistance of the device to vibration and acoustical interference.

The screen provides an additional light protection, makes the structure more rigid, and stabilizes the temperature.

This invention permits the holographic recording device to be operated by personnel without any special training.

In addition, this invention makes it possible to manufacture portable holographic recorders.

What is claimed is:

1. A holographic recording device comprising:
   an acoustical and vibration protection package, said acoustical and vibration protection package comprising:
   an enclosure;
   at least three supporting elements having openings, spaced apart, and arranged parallel to one another inside said enclosure;
   at least two rods arranged parallel to one another and rigidly secured to said supporting elements;
   a coherent light source producing a source beam and rigidly secured to at least two of said supporting elements of said acoustical and vibration protection package;
   a means for producing reference and object beams, which is rigidly secured to said supporting elements of said acoustical and vibration protection package and is placed in the path of said source beam, which produces reference and object beams, said object beam being directed to an interposed holographic object, said reference and object beams having a superposition plane;
   a holographic recorder positioned in said superposition plane of said reference beam and said object beam;
   said openings in said supporting elements of said acoustical and vibration protection package being provided in such shape and number as dictated by the selection of said means for producing said reference and object beams, a screen for protecting the said means for producing reference and object beams, said holographic object and said holographic recorder from the effect of the said source of coherent light, said screen being housed in the said enclosure in a perpendicular relationship to the said supporting elements and rigidly fixed thereto.

2. A holographic recording device as claimed in claim 1, wherein said supporting elements of said acoustical and vibration protection package are made as plates.

3. A holographic recording device comprising:
   an acoustical and vibration protection package, said package comprising:
   an enclosure;
   a screen positioned in said enclosure;
   a first plate having a surface and a slot, and arranged inside said enclosure, said screen extending through said slot and rigidly attached to said first plate;
   a second plate having a surface, a slot, and a first and second round openings, said screen extending through said slot and rigidly attached to said second plate;
   a third plate having a slot, a round and rectangular openings and positioned inside said enclosure, said screen extending through said slot and rigidly attached to said third plate;

a first rod rigidly secured to said plates;
a second rod rigidly secured to said plates;
a coherent light source producing a source beam and extending through said first round opening and said round opening of said second and third plates respectively;
a means for producing reference and object beams, said means comprising:
   a first mirror rigidly positioned on said surface of said first plate of said acoustical and vibration protection package in the path of said source beam;
   a second mirror rigidly positioned on said surface of said second plate of said acoustical and vibration protection package at an angle to said first mirror in the path of said source beam reflected from said first mirror and directed through said round opening;
   a beamsplitter rigidly positioned on said surface of said second plate in the path of said source beam reflected from said second mirror and directed through said second round opening of said second plate, which divides said source beam into an object beam directed to an interposed holographic object and said reference beam, said object beam and said reference beam having a superposition plane;
   a third mirror rigidly arranged in said surface of said second plate parallel to said beamsplitter in the path of said reference beam;
   a first lens positioned on said beamsplitter in the path of said object beam;
   a second lens positioned on said third mirror in the path of said reference beam reflected therefrom;
a holographic recorder positioned in said rectangular opening of said third plate in said plane of superposition of said object and reference beams.

* * * * *

UNITED STATES PATENT AND TRADEMARK OFFICE
CERTIFICATE OF CORRECTION

PATENT NO.  : 4,707,053
DATED       : November 17, 1987
INVENTOR(S) : GUREVICH, et al.

Figure 4:
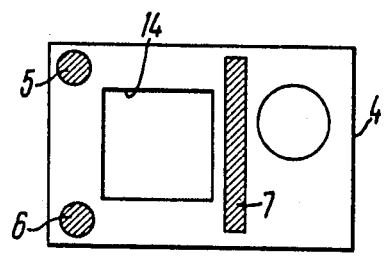
FIG. 4 shows a view taken along arrow A in FIG. 1, minus the coherent light source, according to the invention.
Figure 3:
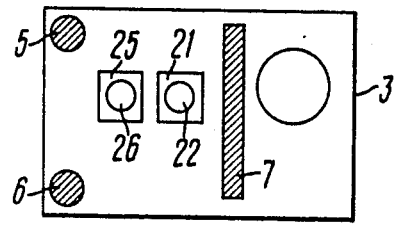
FIG. 3 shows a section view taken along line III—III in FIG. 1, minus the coherent light source, according to the invention.

It is certified that error appears in the above-identified patent and that said Letters Patent is hereby corrected as shown below:

Figures 3 and 4 should appear as follows:

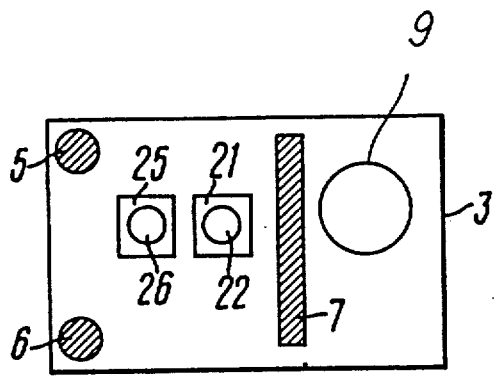 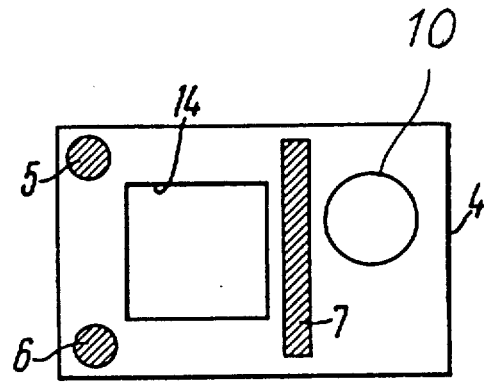

Signed and Sealed this

Third Day of January, 1989

Attest:

DONALD J. QUIGG

Attesting Officer

Commissioner of Patents and Trademarks